July 6, 1954  N. D. EAGON ET AL  2,682,746
MULTIPLE CONTROL DEVICE FOR AIRCRAFT ENGINES
HAVING A LINKAGE OVERRIDE MECHANISM
Filed Feb. 23, 1951  4 Sheets-Sheet 2
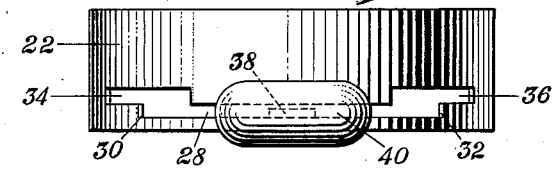
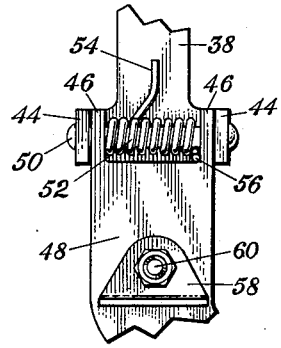
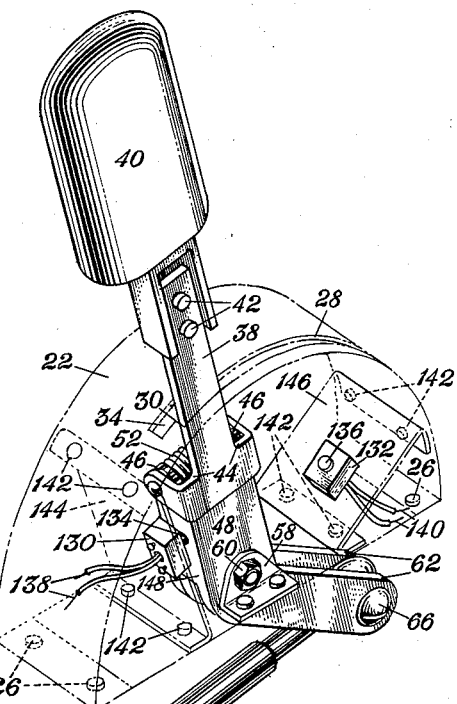
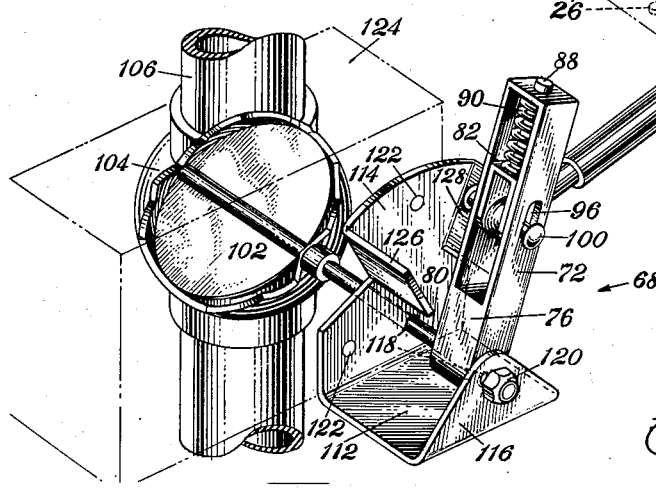
INVENTORS:
Norton D. Eagon
Robert D. Furay
BY
Attorney.

July 6, 1954     N. D. EAGON ET AL     2,682,746
MULTIPLE CONTROL DEVICE FOR AIRCRAFT ENGINES
HAVING A LINKAGE OVERRIDE MECHANISM
Filed Feb. 23, 1951     4 Sheets-Sheet 3

INVENTORS:
Norton D. Eagon
Robert D. Furay
BY
Attorney

July 6, 1954 N. D. EAGON ET AL 2,682,746
MULTIPLE CONTROL DEVICE FOR AIRCRAFT ENGINES
HAVING A LINKAGE OVERRIDE MECHANISM
Filed Feb. 23, 1951 4 Sheets-Sheet 4
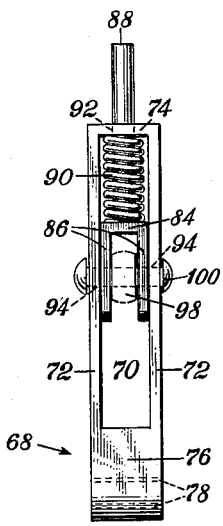
Fig. 9
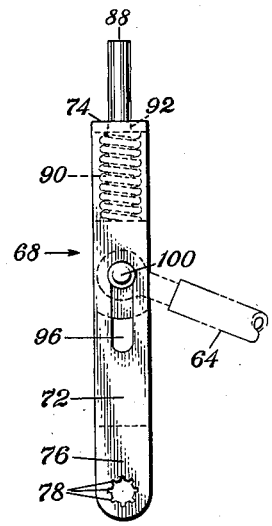
Fig. 10
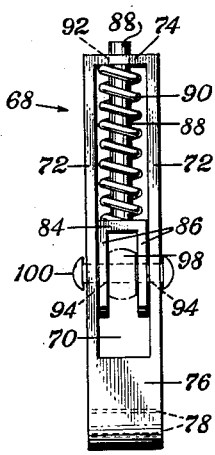
Fig. 7
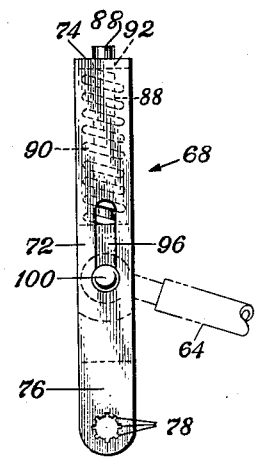
Fig. 8
INVENTORS:
Norton D. Eagon
Robert D. Furay
BY
Attorney Patented July 6, 1954

2,682,746

UNITED STATES PATENT OFFICE 2,682,746

MULTIPLE CONTROL DEVICE FOR AIRCRAFT ENGINES HAVING A LINKAGE OVERRIDE MECHANISM

Norton D. Eagon, Grand Prairie, and Robert D. Furay, Dallas, Tex., assignors, by mesne assignments, to Chance Vought Aircraft, Incorporated, a corporation of Delaware Application February 23, 1951, Serial No. 212,338

5 Claims. (Cl. 60—35.6)

This invention relates to aircraft and particularly to override devices suitable as governor overrides for jet engine powered aircraft.

In modern aircraft and especially in military aircraft a multiplicity of controls are necessary. It is highly desirable to make aircraft controls as compact, co-acting, automatic, and as simple to operate as possible in order to free the pilot for non-routine duties.

In jet engine powered aircraft it is necessary to have a governor on the fuel supply to the jet engine in order to regulate both the temperature in the engine and the speed of the aircraft. It is also necessary to initiate the starting mechanism of the aircraft while at the same time the jet engine governor is in a minimum idling speed position. Further, it is necessary, especially in military aircraft, to be able to increase the power output or thrust of the engine beyond the power provided by the jet engine for short periods of time. This is done by the injection and ignition of fuel in the exhaust gases flowing from the engine. A mechanical arrangement providing for this process is known as an afterburner and it is of course necessary to turn on this device with the jet engine governor maintaining its maximum or full throttle position.

This invention has for one of its objects the consolidation of controls for the above stated operations, reducing the same to one simple, manually operated control to alleviate somewhat the cluttered condition of the aircraft cockpit.

An object of this invention is to provide an override mechanism which is both efficient and simple in construction and operation.

Another object of this invention is to provide an override mechanism in conjunction with a throttle which is suitable in aircraft for actuating secondary systems while overriding the controls for certain primary systems.

Another object of this invention is to provide a single, manually operated throttle with an override device which will control the starting system, jet engine fuel system, and the afterburner system of a jet powered aircraft.

Other object and advantages will be apparent from the specification and claims, and from the accompanying drawings which illustrate an embodiment of the invention.

Briefly, this invention consists of a throttle to operate a jet engine governor valve and an override link mechanism which will override a normal range of throw and permit the throttle lever to close a microswitch which operates the starting system of the engine while the governor is in its minimum idling position. In the same manner it will also permit the throttle lever to close a microswitch which operates the afterburner system while the governor is in its maximum or full throttle position.

In the drawings:

Fig. 2 is a perspective view of the throttle and override mechanism per se of the present invention shown on a larger scale;

Fig. 3 is a top plan view of the throttle handle and throttle housing;

Fig. 4 is a fragmentary elevational view of the throttle lever showing the biased pivotal connection between the throttle lever and a connecting link;

Fig. 7 is an enlarged front view of the spring-loaded override arm when the throttle is in either of the positions shown in Fig. 5;

Fig. 8 is a side view of the spring-loaded override arm shown in Fig. 7;

Fig. 9 is an enlarged front view of the spring-loaded override arm when the throttle is in either of the positions shown in Fig. 6; and Fig. 10 is a side view of the spring-loaded override link shown in Fig. 9.

Figure 1:
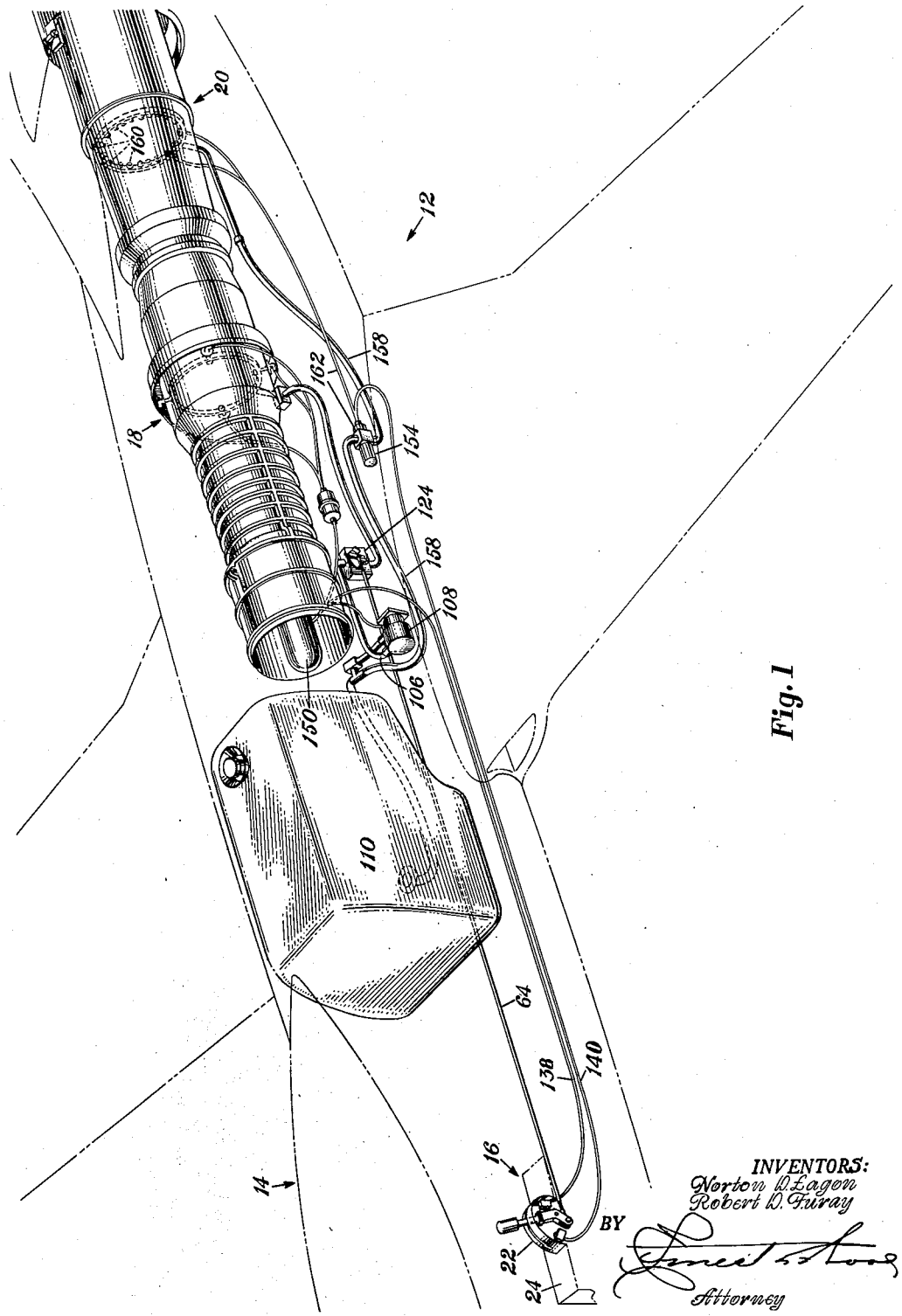
Fig. 1 is a perspective view of an airplane in phantom showing the jet engine and afterburner systems.
Figure 5:
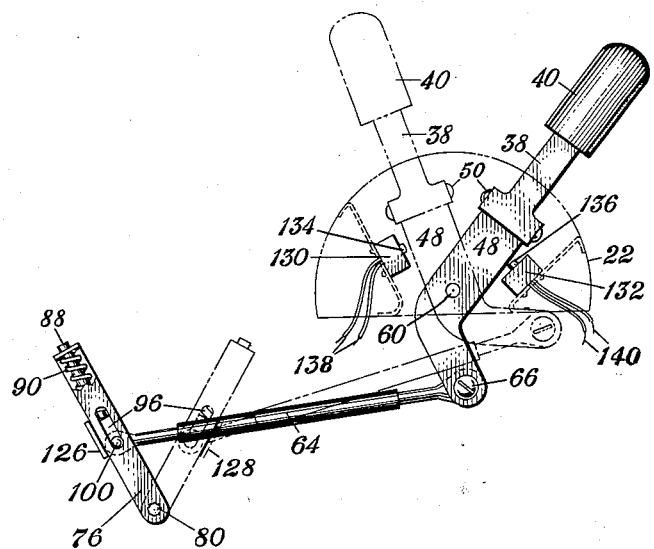
Fig. 5 is a side elevational view of the throttle and override mechanism, the throttle being shown at each end of its normal range of throw, that is, in a minimum idling or closed position as shown in dotted lines and in a full throttle or open position as denoted by full lines.

In Fig. 1, reference numeral 12 denotes generally an airplane having a cockpit 14 in which is situated throttle controls 16 for a jet engine 18 and an afterburner 20.

Referring now to Figs. 2 and 3, the throttle control housing 22 is rigidly secured to aircraft structure, e. g., to the console panel in the cockpit, by rivets 26. The throttle control housing 22 has an arcuate top in which is made a longitudinal slot 28. The slot 28 has a shoulder or abutment 30 adjacent its aft extremity and a like abutment 32 adjacent its forward extremity which abutments are defined by offset portions 34 and 36, respectively, in the ends of the slot 28. A throttle lever 38 travels in the slot 28 and has on its upper end a handle 40 rigidly secured thereto by pins 42. The lower end of lever 38 has formed thereon a pair of right angular apertured ears 44 between which fit snugly a like pair of apertured ears 46, the latter extending upwardly from a link or arm 48, as shown in Fig. 4. A pin 50 extends through aligned apertures in the ears 44 and 46, thereby forming a pivotal connection between lever 38 and arm 48. A torsion spring 52 surrounds the pivotal pin 50, one end 54 of the spring 52 extending upwardly and bearing against lever 38 while the opposite end 56 of the spring extends generally perpendicular to the outboard surface of lever 38 and bears against the top surface of that portion of link 48 between the ears 46. The spring 52 is in torsion and normally urges lever 38 to maintain a position against the lower side of slot 28 (as shown in Fig. 3 of the slot 28. This tends to keep the lever 38 from entering an offset portion 34 or 36 of slot 28 during normal travel of the lever. The arm 48 is rotatably secured to an appropriate part 58 of the aircraft structure by a shaft 60. The arm 48 has free oscillative movement within the limits prescribed by the ends of the slot 28 in which the lever 38 travels. The lower extremity of arm 48 is bifurcated at 62 to receive one end of a rod or link 64 which is pivotally secured between the bifurcations 62 by a pin 66, the latter extending through aligned holes in bifurcations 62 and link 64. The link 64 extends aft and is pivotally secured to an arm 68, shown in 2 and 7 to 10 inclusive. The arm 68 is a slotted member and has an opening 70 defined by its two sides 72 and upper end 74. The lower end 76 of the arm 68 has an opening therein provided with splines 78 by which the arm is secured to an engine fuel valve shaft 80 (Fig. 2).

In the open portion 70 of arm 68 is disposed an inverted U-shaped form 82, composed of horizontal plate 84 and depending parallel arms 86. A rod 88 made integral with or secured to plate 84 at one end extends upwardly therefrom and axially through a compression spring 90, its upper end extending through an aperture 92 in the upper end portion 74 of arm 68.

As best seen in Figs. 7 and 8, the sides 72 of arm 68 have elongated slots 96 therein midway of their length and in register with each other. Link 64 terminates in a fitting which is pierced with an aperture 98. The depending arms 86 of fork 82 are pierced with apertures 94 in register with each other. The fitting end of link 64 is positioned between the arms 86 of fork 82 which in turn is positioned between the sides 72 of arm 68 so that apertures 94, 98 and slots 96 are all in register and a pin 100 is inserted therethrough and its end riveted to provide a loose fit whereby fork 82, carrying the end of link 64 can slide longitudinally of arm 68, its sliding movement being limited by the travel of pin 100 in slots 96.

The upper end of the compression spring 90 bears against the under side (Fig. 7) of the end 74 of arm 68 and the lower end of spring 90 bears against the plate 84 of fork 82. The spring is kept within confines by the rod 88 extending through it. The fork 82, by the action of spring 90 is urged downwardly hence the pin 100 normally rests at the bottom of slots 96.

The engine fuel valve shaft 80, as above set forth, being splined at 78 to the lower end of the arm 68, oscillative movement applied to the arm 68 will be transmitted to the shaft 80, thus to actuate a butterfly 102, rigidly attached to an end of shaft 80 and operating in the throttle valve housing 104. Valve 104 is arranged in the fuel line 106 through which fuel is conveyed from a fuel reservoir 110 to the jet engine 18 of the aircraft 12. Supporting the arm 68 for oscillative movement is a bracket 112, formed with upstanding flanges 114 and 116 having aligned openings 118 in which is journaled the governor shaft 80, in the manner shown in Fig. 2. A nut 120 is applied to the end of the shaft 80 to preclude longitudinal displacement thereof. The flange 114 of bracket 112 is larger than the companion flange 116 and is composed of a substantially flat plate rigidly attached by rivets through holes 122 to the engine fuel valve housing 124 shown in Fig. 1. The flange 114 is made in substantially fan shape to provide wings which are turned inwardly at right angles to the flange and disposed to define opposed stops of abutments 126 and 128, disposed in the oscillative path of arm 68.

When arm 68 is displaced a predetermined distance clockwise or counter-clockwise, it comes into contact with the flanged stop member 126 or 128 and is thereby prevented further movement. The linkage arrangement is such that when arm 68 abuts flange 128, lever 38 abuts the slot aft abutment surface 30, and when arm 68 abuts flange 126 the lever 38 abuts the forward slot abutment surface 32. It is thus seen that arm 68 limits the turning movement of shaft 80 and hence butterfly 102 by coming in contact with flange 126 or 128.

Throttle lever 38 is caused to travel in the normal slot 28 of housing 22 to provide normal engine operation through the engine throttle. Arm 48 is rotatable on shaft 60 and through pin 66 causes link 64 to travel forward or aft. Link 64, pivoting on pin 100, which remains at the bottom of slots 96 under pressure of spring 90, causes arm 68 and the engine fuel valve shaft 80 to turn about the axis of shaft 80 until arm 68 is brought up against either of the flanged stop members 126 or 128. When the throttle lever 38 is in contact with the aft stop shoulder 30 in the slot 28, and the arm 68 is in contact with stop member 128, with pin 100 positioned at the bottom of slots 96 of arm 68, the engine fuel valve is positioned for minimum idling engine power. Likewise, when throttle lever 38 is brought into engagement with the abutment surface 32 at the forward extremity of the normal slot 28, arm 68 will be in contact with stop member 126 of the bracket 112 and pin 100 will be positioned at the bottom of slots 96 of arm 68. When the described parts are thus positioned, the engine fuel valve shaft 80 and therefore the fuel valve 104 are set for full engine power.

Within housing 22 are two microswitches 130 and 132 which are of conventional design having spring-loaded plungers 134 and 136, respectively, and are adapted to close electrical circuits 138 and 140, respectively. The microswitches 130 and 132 are rigidly attached to plates 144 and 146, respectively, which latter are riveted to the inside of housing 22 as by rivets 142. Microswitches 130 and 132 are located in the rotational path of arm 48 opposite the offset portions 34 and 36 of slot 28 but are positioned so that arm 48 will not depress either of the plungers 134 or 136 while lever 38 is in slot 28, but will fully depress one of the microswitch plungers when the lever 38 is brought into and to the end of one of the offsets 34 or 36. When lever 38 is at the aft extremity of slot 28 and against abutment surface 30, the throttle position is that for a minimum engine idling condition which is ideal for starting the engine.

Figure 6:
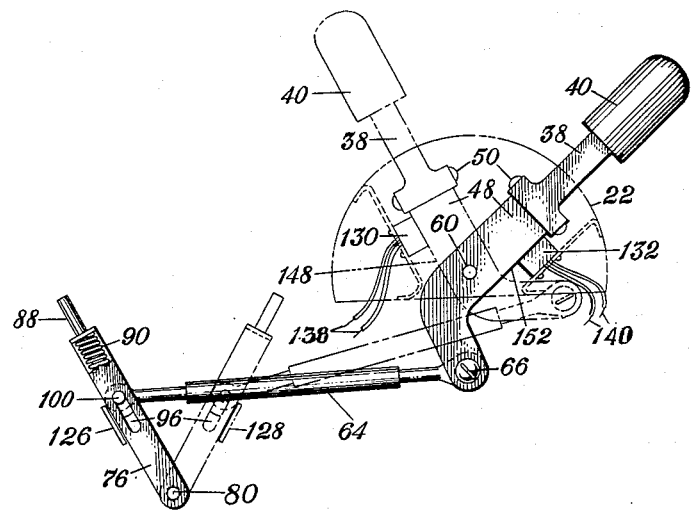
Fig. 6 is a side elevational view of the throttle in overriding positions beyond its normal range of throw, the throttle being shown in dotted lines for the starting position and full lines for the afterburner position.

When it is desired to start the engine 18 of the aircraft, the throttle lever 38 pivoted about pin 50 and against the resistance of spring 52 and then moved further aft into offset 34 of slot 28 (Fig. 6). This causes arm 48 to exert a pull on link 64, urging pin 100 toward the top of slots 96 in arm 68 against the force of spring 90. Pin 100 urges the fork 82 upwardly within the arm 68.

When throttle lever 38 is moved to the dotted position shown in Fig. 6, flat surface 148 of arm 48 will come into contact with microswitch 130, depressing plunger 134, thereby closing electrical circuit 138 to actuate the starter 150 of the jet engine 18.

To turn on the afterburner system of the aircraft, the throttle lever 38 is moved outwardly into and to the end of offset 36 of slot 28 as shown in solid lines in Fig. 6. This causes arm 48 to put link 64 in compression urging pin 100 toward the top of slots 96 in arm 68. Pin 100 urges the fork 82 upwardly within arm 68, compressing spring 90. When throttle lever 38 is moved to the position shown in solid lines in Fig. 6, flat surface 152 of arm 48 will come into contact with microswitch 132 depressing its contact plunger 136, thereby closing electrical circuit 140 to actuate the afterburner fuel control system 154. This control system causes fuel to be conveyed through a fuel line 158 from the fuel reservoir 110 to the afterburner fuel nozzles 160. Circuit 140 also actuates the afterburner ignition system 162.

It is to be noted in Fig. 6 that when either of the circuits 138 or 140 is closed the arm 68 cannot move because of stop 126 or 128, whichever the case may be. The engine fuel valve shaft 80 and valve 104 therefore remain within the limits of the minimum idling position or full throttle position. This is accomplished by the additional push or pull exerted on link 64 being absorbed by compression spring 90 allowing the loose pin connection 100 to ride up in the slots 96 of arm 68.

It is of course to be understood, that in the place of microswitches, any suitable actuating device for electrical, hydraulic, or mechanical systems may be substituted to activate other systems than the starting and afterburner systems as described in this preferred embodiment of the invention.

It is thus seen that an override mechanism which may be used with throttle type controls has been devised which is simple in construction and design and is also simple in operation. This override mechanism makes possible the actuation of several systems while maintaining certain conditions with respect to a particular control by the operation of only one lever.

While only one embodiment of the invention has been shown in the accompanying drawings, it will be evident that various modifications are possible in the arrangement and construction of the override and throttle mechanism components without departing from the scope of the invention.

What it is desired to be secured by Letters Patent is:

1. In an airplane having a jet engine and an afterburner: a fuel valve control mounted in the cockpit of said airplane for manual manipulation within a normal range and first and second abnormal ranges, a fuel reservoir, a fuel line from said fuel reservoir to said engine, a valve in said fuel line for controlling the flow of fuel to said engine including idling and full throttle settings, connecting means between said control and said fuel valve for opening and closing the latter during manipulation of said control within its normal range including a lost motion means, a starter system for starting said engine, an ignition system for igniting said afterburner, means on said control for operating said starter system when said control is manipulated in its said first abnormal range, means on said control for operating said ignition system when said control is manipulated in its second abnormal range, and means for rendering said lost-motion means effective during manipulation of said control in said abnormal ranges whereby said fuel valve is held in its idling and full throttle settings when said fuel valve control is manipulated in said first and second abnormal ranges respectively.

2. In combination with an airplane, a jet engine and an afterburner, a fuel reservoir within the confines of said airplane, a fuel line from said reservoir to said engine, a valve in said fuel line for controlling the flow of said fuel, a starting system for said engine, means for igniting said afterburner, a throttle lever mounted on said airplane for manual operation and adapted to control said valve between idling and full power positions of said engine, and means associated with said throttle lever for selectively energizing said starting system when said lever is moved beyond said idling position while maintaining said valve in said minimum idling position or for energizing said afterburner ignition means when said lever is moved beyond said full power position while maintaining said valve in said full power position.

3. In combination with an airplane, a jet propulsion power plant and an afterburner, a fuel reservoir having fuel lines to said power plant and said afterburner, a valve in said fuel line to said power plant, means associated with said power plant for starting the same, ignition means associated with said afterburner for igniting the same, a throttle control lever operatively associated with said valve for governing the same and movable beyond idling and full throttle positions respectively, abutment means associated with said throttle control lever for determining idling and full throttle position of the lever corresponding to the minimum open and full open settings of said valve, means associated with said throttle control lever for selectively energizing said engine starting means and said afterburner ignition means when said throttle control lever is moved beyond said idling and full throttle positions respectively, and means for maintaining said minimum open and full open positions of said valve when said throttle control lever is moved beyond said idling and full throttle positions respectively.

4. A multiple control device for an aircraft engine comprising: an engine throttle, a throttle control lever having a normal range of travel for normal control of engine operation including an idling position and a second path of travel beyond said idling position, an operative connection between said throttle control lever and said throttle, abutment means in the normal path of travel of the throttle control lever for restraining movement of said lever beyond its normal range of travel during normal control of the engine operation, a switch for energizing the starting system of said engine located in said second path of travel of said throttle control lever beyond its idling position, an articulated joint in said throttle control lever whereby a portion of the same may be moved out of its normal path of travel and beyond said abutment means into said second path of travel, means yielding to movement of said throttle control lever beyond the idling position of its normal range of travel in a direction opposite to the direction of throttle opening movement for energizing said engine starting system switch, and means for maintaining the idling setting of said throttle when said throttle control lever is moved beyond said idling position of its normal range of travel into said second path of travel to energize said engine starting system switch including lost motion means in said operative connection between throttle control lever and said engine throttle.

5. A multiple control device for an aircraft engine having an afterburner comprising: an engine throttle, a throttle control lever movable beyond idling and full throttle positions, abutment means in the normal path of travel of said throttle control lever for restraining movement of said lever beyond its normal range of travel during normal control of the engine operation, a starting system for said engine, an ignition system for said afterburner, means yielding to movement of said throttle control lever beyond its normal range of travel for selectively energizing said engine starting system and said afterburner ignition system, and means for maintaining the idling setting of said throttle when said throttle control lever is moved beyond said normal range of travel to energize said engine starting system and for maintaining the full power setting of said throttle when said throttle lever is moved beyond said normal range of travel to energize said afterburner ignition system.

References Cited in the file of this patent

UNITED STATES PATENTS

| Number | Name | Date |
|---|---|---|
| 1,553,319 | Lardner | Sept. 15, 1925 |
| 1,743,241 | Schmidt | Jan. 14, 1930 |
| 1,998,362 | Dodson | Apr. 16, 1935 |
| 2,102,909 | Paton | Dec. 21, 1937 |
| 2,120,555 | Good | June 14, 1938 |
| 2,215,243 | Klages | Sept. 17, 1940 |
| 2,489,586 | Ray | Nov. 29, 1949 |
| 2,529,508 | MacDonald | Nov. 14, 1950 |
| 2,570,591 | Price | Oct. 9, 1951 |